United States Patent
Zhang

(10) Patent No.: US 8,600,012 B1
(45) Date of Patent: Dec. 3, 2013

(54) METHODS AND SYSTEMS FOR PROVIDING PRE-CALL-CONNECTION MESSAGING SERVICES TO CALLING PARTIES

(75) Inventor: Baoquan Zhang, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 280 days.

(21) Appl. No.: 12/908,389

(22) Filed: Oct. 20, 2010

(51) Int. Cl.
*H04M 1/64* (2006.01)

(52) U.S. Cl.
USPC ............ 379/67.1; 379/85; 379/88.16; 379/68

(58) Field of Classification Search
USPC .......... 379/67.1, 93.32, 41, 51, 68, 85, 88.25, 379/221.01, 220.01, 225, 88.16, 266.1
See application file for complete search history.

(56) References Cited

U.S. PATENT DOCUMENTS

| | | | |
|---|---|---|---|
| 6,453,023 B1 * | 9/2002 | McKee | ............ 379/88.25 |
| 7,257,388 B2 | 8/2007 | Bayne | |
| 7,920,692 B2 * | 4/2011 | Olshansky et al. | ........... 379/225 |
| 2004/0156493 A1 | 8/2004 | Cohen | |
| 2005/0238148 A1 | 10/2005 | Poustchi et al. | |
| 2007/0280458 A1 | 12/2007 | Aberethy et al. | |

* cited by examiner

*Primary Examiner* — Duc Nguyen
*Assistant Examiner* — Yosef K Laekemariam

(57) ABSTRACT

Disclosed are methods and systems for providing pre-call-connection messaging services to calling parties. In at least one embodiment, a first call-setup request is received from a calling party, reflecting a request that an active call be set up between the calling party and a called party. Responsive to the first call-setup request, at least one network device starts to attempt to establish the active call between the calling and called parties at least in part by transmitting a second call-setup request to the called party. Prior to receiving a response to the second call-setup request, the at least one network device starts to record a message for the called party while continuing to attempt to establish the call. If the active call is not successfully established prior to an affirmative termination of the message recording, the recorded message is thereafter made accessible to the called party.

25 Claims, 7 Drawing Sheets

METHODS AND SYSTEMS FOR PROVIDING PRE-CALL-CONNECTION MESSAGING SERVICES TO CALLING PARTIES

BACKGROUND

Many people use mobile stations, such as cell phones and personal digital assistants (PDAs), to communicate with cellular wireless networks. Service providers that operate these networks typically distribute mobile stations to their subscribers, perhaps by selling the mobile stations at retail outlets or over the Internet, or perhaps by offering mobile stations at no cost to people that subscribe to a particular service plan, etc. Service providers then typically assign to each mobile station a telephone directory number—often known as a mobile identification number (MIN) or mobile directory number (MDN)—under which that mobile station may operate. Via a (e.g., manual or over-the-air) provisioning process, the service provider may cause the mobile station to store its MIN in what is known as its Number Assignment Module (NAM). Furthermore, a mobile station typically is provided at the time of manufacture with an electronic serial number (ESN), which identifies the mobile station as a unique physical device.

These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Of course, other protocols may be used instead or in addition, such as Global System for Mobile Communications (GSM), Time Division Multiple Access (TDMA), WiMax, and/or any others.

Such wireless networks typically provide services such as voice, Short Message Service (SMS), and packet-data communication, among others. A message-recording service may also be provided so that messages can be left for called parties. Message-recording services may facilitate the recording of voicemail messages and/or audio-visual messages via a calling party's mobile station, and the storage of the recorded messages in the service provider's wireless network for eventual access by called parties. Message-recording services may be used by a calling party when a called party is determined by a network to have not accepted a given call, which may occur for any number of reasons, including being away from a called device, not having the device turned on, being on another call, etc.

OVERVIEW

When a calling party dials a called party's MDN, a ringback server in the service provider's wireless network will typically provide a "ringing" ringback tone to the calling party while the network attempts to complete the call, so as to let the calling party know that the network is making that attempt. The calling party must then wait, as the ringback tone plays, for the wireless network to determine whether the called party has accepted the call and/or whether the network can successfully connect the call. In some instances, the calling party may have to wait for between 20 and 30 seconds for the network to make the determination. Once the network determines that the call will not (or cannot) be established, the ringback tone may be stopped, and the calling party may then be informed that they can leave a message for the called party. The calling party may then begin recording such a message, which may then be (at least temporarily) stored in the service provider's wireless network, and subsequently made accessible to the called party.

In the event that a called party is ultimately determined to be unavailable, the time spent by a calling party—waiting for the service provider's network to determine the called party's availability and/or to determine whether it can connect the call—essentially becomes wasted time from the viewpoint of the calling party. It would be advantageous if the service provider's network could, instead, utilize this time to allow the calling party to begin recording a message for the called party, where such a message could then be disposed of upon establishing an active call, or delivered to the called party upon termination of the message recording, among other alternatives.

In accordance with various embodiments, methods and systems provide a pre-call-connection messaging service to a calling party, to better utilize the pre-call-connection time that, previously, would have been wasted. More specifically, and in response to receiving a first call-setup request from a calling party reflecting a request that an active call be set up between the calling party and a called party, at least one network device (i) starts to attempt to establish the active call between the calling and called parties at least in part by transmitting a second call-setup request to the called party, and (ii) prior to receiving (if it ever does) a response to the second call-setup request, starts to record a message for the called party (while continuing to attempt to establish the active call). The message may be temporarily stored at the at least one network device.

In the event that the at least one network device detects an affirmative termination of the message recording prior to successfully establishing the active call, the network device thereafter makes the recorded message accessible to the called party. An affirmative termination of the message recording may comprise one or more of (i) the calling party hanging up and/or otherwise ending the call, (ii) a network device detecting expiration of a timer that limits a duration of the message recording, and (iii) the calling party generating and transmitting a message-termination indication, indicating that he or she is finished recording the message. And other approaches are certainly possible as well, as these possibilities are offered by way of example only.

If, however, the network device detects that the active call has been successfully established prior to an affirmative termination of the message recording, the network device stops, and may dispose of, the message recording. In at least one embodiment, an auditory indication is provided to the calling party indicating that the recording is being (or has been) started, and a same or different auditory tone is provided to the calling party that the recording is being (or has been) stopped.

In at least one embodiment, prior to starting recording of the message from the calling party, the at least one network device determines whether the calling party subscribes to the pre-call-connection messaging service at least in part by retrieving a profile associated with the calling party and examining it. The profile may be retrieved from a profile store located in the network. In addition, the profile may include correlation data that lists particular called parties for which the calling party has enabled the pre-call-connection message services (or perhaps those for which the calling party has disabled the service). In one example, a ringback tone may be provided for those called parties that are not listed in the corresponding calling party's profile, while the pre-call-connection message service is provided for those called parties that are listed in the corresponding calling party's profile.

In at least one embodiment, the pre-call-connection message service may, by default, not be provided to the calling party until a service-enabling indication is received from the calling party, signaling a desire to use the pre-call-connection message services for the current call. For example, prior to receiving the service-enabling indication from the calling party, a ringback tone may be played to the calling party, and subsequent to receiving the service-enabling indication, the playing of the ringback tone may be stopped. The service-enabling indication may be, for example, a pre-defined key press made by the calling party. The pre-defined key press may be the same across all calling parties in the network, or may be defined on a calling-party-by-calling-party basis (and perhaps specified in the profile associated with each calling party).

In at least one embodiment, the profile associated with the calling party may specify a second destination associated with the called party, the second destination being different from the called party destination specified in the call-setup request. In the event that the active call is not successfully established between the calling party and the called party prior to an affirmative termination of the message recording, the recorded message may be made accessible to the called party at least at the second destination specified in the profile. The second destination may comprise one or more of a plain-old-telephone system (POTS) device, a voice-over-internet-protocol (VOIP) device, a message mailbox different from the called party's message mailbox, and a direct inward dialed destination (DID) on a private branch exchange (PBX).

In at least one embodiment, making the recorded message accessible to the called party may include forwarding the recorded message to a message mailbox associated with the called party and/or providing a link to the recorded message to the message mailbox associated with the called party. The called party may then retrieve the pre-call-connection recorded message in the same manner as other messages stored in the called party's message mailbox.

In at least one embodiment, the message comprises a voicemail message. In another embodiment, the message comprises an audio-visual message. Other types of messages could also be used.

Advantageously, by providing the calling party with the ability to begin recording a message for a called party prior to determining whether the call can be completed, the calling party can often more efficiently use the time period during which the service provider network is attempting to complete the call, by beginning to record the message during this time period.

These, as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the claims.

DETAILED DESCRIPTION

Figure 1:
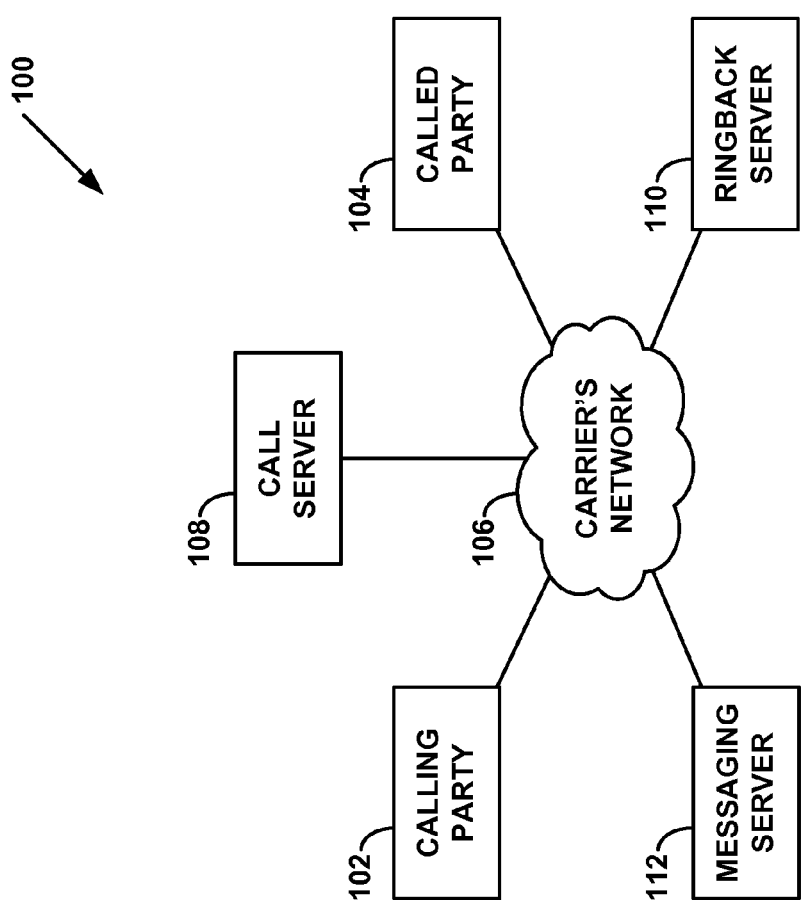
FIG. 1 is a simplified representation of a carrier network in which at least one embodiment can be carried out.

In the following detailed description, reference is made to the accompanying Figures, which form a part thereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood, and is contemplated by the inventor, that aspects of the present disclosure, as generally described herein, and as generally illustrated in the Figures, can be arranged, substituted, combined, and designed in a wide variety of different configurations.

a. OVERVIEW OF AN EXAMPLE NETWORK ARCHITECTURE

FIG. 1 illustrates a simplified version of an exemplary network 100 that could be owned and operated by a service provider in order to provide pre-call-connection messaging service to a calling party during call setup. Network 100 includes carrier's network 106, which supports communication among representative, connected devices and network elements, namely, calling party 102 and called party 104, call server 108, ringback server 110, and messaging server 112. It should be understood that other entities and elements, although not shown, could be included network 100. In an exemplary operation, in the context of FIG. 1, a user represented by calling party 102 could call another user represented by called party 104. Call server 108 may facilitate call setup for such a call, for example, performing call control and signaling to route the call and to coordinate and/or allocate any necessary network resources. During call setup, call server 108 may send called party 104 an alerting signal (e.g., a second call-setup request, which may be a forwarding of a first such request received from calling party 102) and at the same (or nearly the same) time, start recording a message from the calling party. In an alternative embodiment, call server 108 may delay starting to record the message from the calling party, instead transmitting a signal to ringback server 110 instructing server 110 to play a ringback tone to the calling party 102, and may cause messaging server 112 to start recording the message only after receiving a service-enabling indication from the calling party (such as a pre-defined key-press). Other examples are possible as well.

FIG. 1 provides a generic representation of the devices comprising network 100. In practice, however, network 100 could take on various forms. For example, calling and called parties 102, 104 could be wireless cellular mobile stations, carrier's network 106 could be a packet-switched network, and call server 108 could be a mobile switching center (MSC). Further, call server 108 could represent multiple devices of the same or different types. For example, call server 108 could represent one or more telephony switches and one or more MSCs. In a further exemplary embodiment, messaging server 112 and/or ringback server 110 may be integrated with call server 108 and/or with each other. As a further example, ringback server 110 and messaging server 112 could be integrated with one another, separate from call server 108. Other examples are possible as well.

The packet-switched carrier's network 106 may operate in accordance with the Internet Protocol (IP), and support VoIP calls using a protocol such Session Initiation Protocol (SIP) or H.323. In such embodiments, calling and/or called parties 102, 104 could be SIP or H.323 client stations that have wired and/or wireless access to network 106, and call server 108 could be a SIP proxy server or an H.323 gateway. These exemplary forms of network 100 are meant as illustrations, and others are certainly possible.

In these and other embodiments, the basic operation of the network 100 may be similar, namely, involving (i) receiving from the calling party 102 a first call-setup request reflecting a request that an active call be set up between the calling party 102 and the called party 104, (ii) attempting to establish the active call between the calling and called parties 102, 104 at least in part by transmitting a second call-setup request to the called party 104 (which may or may not be a forwarded copy of the first call-setup request), (iii) prior to establishing an active call between the calling and called parties, starting to record a message from the calling party 102 while continuing to attempt to establish the active call, and (iv) if an affirmative termination of the message recording is received prior to successfully establishing the active call, thereafter making the recorded message accessible to the called party subsequent to the affirmative termination of the message recording. It should be understood that this summary of the basic operation is exemplary, and that in practice, there may be many variations of the specific steps, as well as of the numbers and types of clients and network entities and elements involved, all within the scope of the present disclosure.

Figure 2:
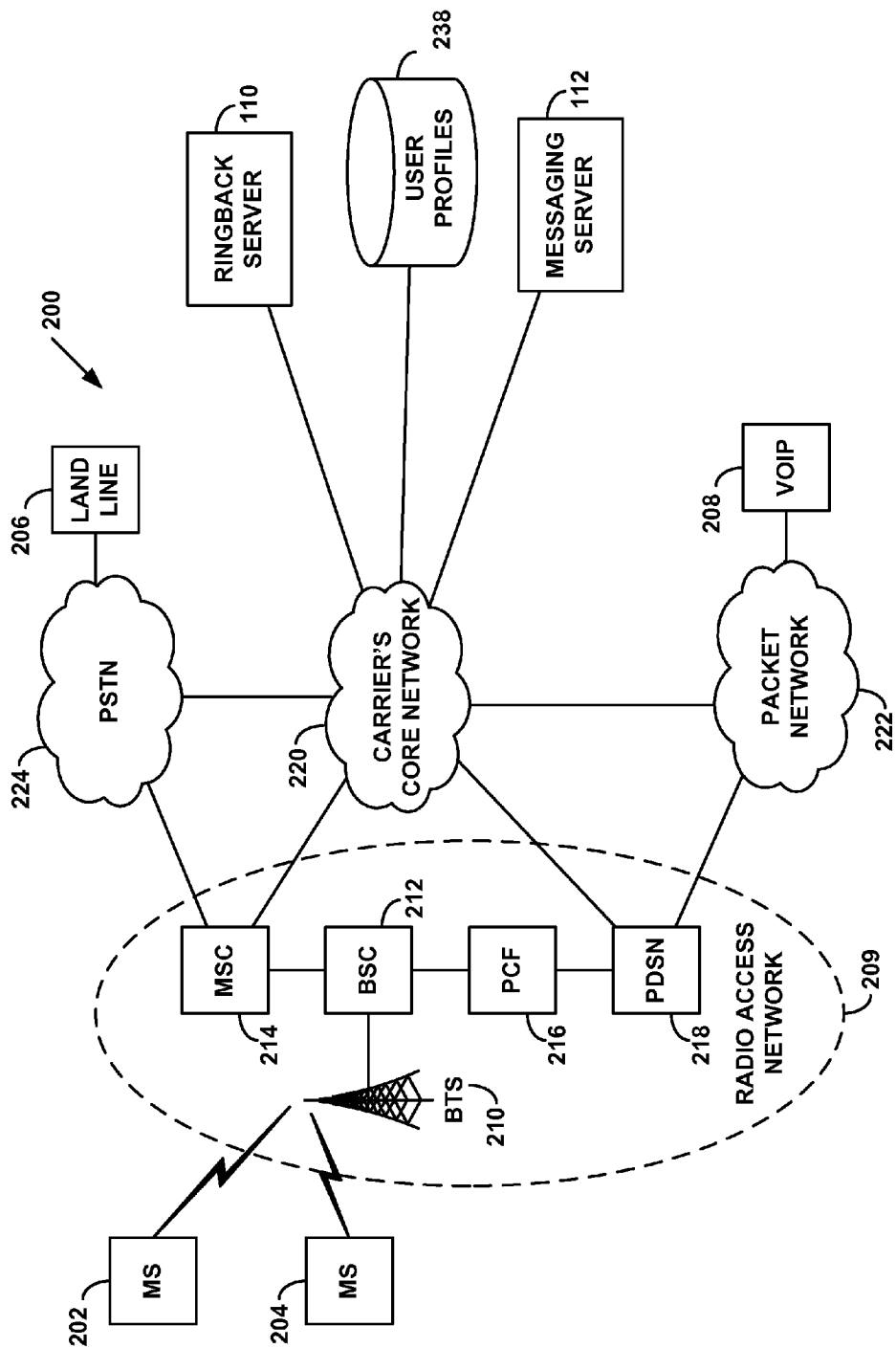
FIG. 2 is a more detailed representation of a carrier network in which at least one embodiment can be carried out.

Further exemplary embodiments may be understood by considering FIG. 2, which depicts a more detailed representation of a telecommunication network 200 that includes, by way of example, network elements and components suitable for supporting both circuit-based telecommunication services, such as cellular and landline voice calls, and packet-based data communication services, such as web browsing, VoIP, and e-mail communication, among other example forms of communication.

Example network 200 includes a carrier's core network 220, which is connected to one or more access networks/systems, such as a radio access network (RAN) 209, and one or more transport networks, such as a public switched telephone network (PSTN) 224 and a packet network 222. Also connected with the core network 220 are a ringback server 110, a user-profiles database 238, and a messaging server 112, which together with other aspects of network 200 and connected client stations (e.g., mobile stations 202 and 204, landline phone 206, and VoIP phone 208) comprise elements of at least one embodiment.

Core network 220 provides connectivity to various elements, components, and entities of network 200, and serves at least as a transport network for communications among them. Operationally, core network 220 also supports delivery of circuit-based user services and features via signaling and bearer channels carried, for example, over inter-switch digital trunks for regional and long-distance calls. As such, core network 220 may also comprise (or be in communicative contact with) what is commonly referred to as a backbone network. Core network 220 could be an ATM and/or IP-based network, as examples, and could comprise more than one physical and/or logical network and/or sub-network, as well as interconnecting routers and switches. Other transport technologies are possible as well, as are a variety of network topologies and routing/switching protocols and platforms.

In the context of FIG. 2, core network 220 represents at least the communicative coupling of the attached elements shown, as well as other possible entities that are not shown. Note, however, that the exemplary connectivity between network entities provided via core network 220 is not intended to be limiting with respect to other methods or means of communication between any two or more network entities, elements, or components. For example, a group of servers and databases that supports a coordinated set of functions, such as billing or user account services, could communicate within an IP sub-network or LAN that is itself connected to core network 220 via a router, or the like. Other arrangements are possible as well, within the skill of one in the art.

As noted above, network 200 also includes packet network 222, which may be a different physical network from core network 220, a separate virtual network overlaid on core network 220, or some combination of both. Other arrangements are possible as well. Packet network 222 may provide packet-data transport and other services to users and to network servers and other network entities that require packet-data communications. In at least one embodiment, packet network 222 is an IP network, capable of supporting, for instance, web browsing, VoIP, and other services. Although not shown in FIG. 2, packet network 222 may also include various servers for packet-based services, and provide connectivity to other packet networks, for example those of other service providers, and/or the public Internet, etc.

Users may access features and services of network 200 via one or more client stations, depicted in FIG. 2 by client stations 202, 204, 206, and 208. Each illustrates by way of example a different mode and technology of network access, perhaps as well as a different form of client station. For example, client stations 202, 204 may represent wireless third-generation (3G) and/or fourth-generation (4G) cellular mobile stations (MSs), or the like, that may support both circuit-cellular and packet-data communications using CDMA, GPRS/GSM, or some other cellular radio access technology, for instance. Client station 206 may represent a landline telephone, such as one used for circuit-based residential service with a local exchange carrier (LEC) (not shown). Alternatively, telephone 206 could be a digital PBX phone that accesses the LEC via a PBX switch (not shown), for example, and may provide one or more direct inward dialed destinations (DIDs) on the PBX. Client station 208 may represent a packet-switched telephony device, such as a packet-telephony (e.g., VoIP) phone, or the like, with wired local-area network (e.g., Ethernet) or wireless local area network (e.g., 802.11) access to the packet network 222.

These example client stations are not meant to be limiting, and other types and/or combinations of devices are possible. For instance, client station 208 could alternatively be a personal computer (PC) or workstation having a WLAN interface. Further, MSs 202, 204 could incorporate technology for WLAN access as well as cellular radio access, thus supporting so-called dual-mode capability. Any many other examples are certainly possible.

Client stations may access network 200 via one or more of the connected access networks, each of which may comprise at least one switch, router, and/or similar entity having one or more interfaces to network 200. For example, cellular radio access to network 200 by MS's 202 and 204 is provided by RAN 209. As illustrated in FIG. 2, RAN 209 comprises base transceiver station (BTS) 210 connected to the network via base station controller (BSC) 212, which in turn is connected both to the circuit-cellular network via MSC 214, and to the packet-data network via packet data serving node (PDSN) 218, by way of packet control function (PCF) 216. PDSN 218 also includes a connection to core network 220.

In typical operation of RAN 209, BTS 210 provides an air interface link to MSs 202, 204 (or similar device), while BSC 212 controls BTS 210, for example assigning specific air interface channels and managing mobility of MSs 202, 204. For circuit-cellular services, such as circuit-based telephony, communications are then routed between BSC 212 and MSC 214, which in turn provides connectivity to core network 220, to one or more other MSCs or circuit telephony switches (either directly or via core network 220), or to PSTN 224 via digital trunks or similar links to a switch or switches in the PSTN 224. For packet-data services, such as web browsing and IP multi-media services, communications are instead routed between BSC 212 and packet network 222 via PDSN 218, by way of PCF 216. It should be noted that even though MS 202 and MS 204 are both shown in FIG. 2 to be associated with RAN 209 for illustrative purposes, in practice they need not actually be associated with the same BTS 210, BSC 212, MSC 214, PDSN 218, or even the same RAN 209.

The components of RAN 209 illustrated in FIG. 2 represent functional elements, and although only one of each is shown in the figure, a given deployment may in practice include more than one of any or all them in various configurations. For example, as noted above, a given BSC could control multiple BTSs. Further, an MSC could in turn control multiple BSCs, and a given metropolitan area could include multiple MSCs or even multiple RANs connected via carrier's core network 220 or other interconnecting network, for example. The above examples are not meant to be exhaustive or limiting, but merely illustrative.

Additionally, each functional element of RAN 209 may be implemented as a separate physical entity, or various combinations of them may be integrated into one or more physical platforms. For example, BTS 210 and BSC 212 may be implemented in a single physical device. Similarly, PCF 216 and PDSN 218 could be combined on a single platform. Other physical configurations of the functional elements of the RAN 209 may also be realized.

Access to landline circuit-based services and landline phones such as landline phone 206 in network 200, may be provided via PSTN 224. Phone 206 may be coupled to PSTN 224 via one or more digital trunks or similar links to a switch or switches in the PSTN 224. Access by a device such as the phone 206 to PSTN 224 could be via residential local loop, or a digital or analog line to an intervening PBX switch (not shown), for example. Other arrangements are possible as well.

Access to packet-data services such as web browsing, VoIP, and email communications, and access to packet-data based phones such as VoIP phone 208, in network 200, may be provided via packet network 222. Phone 208 may be coupled to packet network 222 via one or more local area networks (LANs), a packet-cable distribution system, a cable modem distribution system, a digital subscriber line (DSL) distribution system, or the like, which provides connectivity between phone 208 and packet network 222. And other examples are possible as well.

User-profiles database 238, ringback server 110, and messaging server 112 represent functional elements that could take various forms in practice. For example, user-profiles database 238 could be maintained in association with a home location register (HLR) in a cellular wireless network, for example. Other combinations or configurations are also possible. An indication that a calling party is a subscriber to pre-call-connection messaging service could be contained in a user profile returned in response to a query to user-profiles database 338, the query perhaps made by call server 108 (e.g., MSC 214, or some combination of entities in RAN 209). Alternatively, user-profiles database 238 could be part of the HLR, as noted above, in which case the profile could be returned in a response to a query from the HLR. Other possibilities exist as well.

Ringback server 110 may store a ringback tone for playback to a calling party during call setup. A ringback tone in both circuit-based and packet-based (e.g., VoIP) networks is often stored as an audio data file at a server such as the ringback server 110, and played out, for instance as streaming media data, to a calling party's phone during call setup when the server receives a signal, from a terminating switch for example, indicating that the called party's phone is being alerted. The portion of call-setup time during which ringback is played is typically referred to as the ringback period. At or around the time that a call is successfully connected, the ringback server 110 will stop playback of the ringback tone.

Messaging server 112 may store audio and/or video messages for delivery to one or more called parties. Message server 112 may maintain a storage array to support a large amount of data, and may maintain messages in one or more files of various formats, such audio files (wave files, MP3 files, etc.) and/or audio-video files (mpeg files, avi files, etc.) suitable for playing by one or more programs on a client station such as MSs 202, 204. Messaging server 112 may be utilized to store all messages for all users in network 200, or just messages related to the pre-call-connection messaging service, as examples. Messaging server 112 may maintain a communications interface allowing it to communicate with, for example, MSC 214 (among other devices in the RAN 209) via its carrier's core network 220. In the event a called party is associated with a carrier different than network 200, messaging server 112 may be configured to transmit messages temporarily stored during execution of pre-call-connection messaging services to the called party's home network via the communications interface and, perhaps, packet network 222. And other possibilities exist as well.

Further, while ringback server 110, user-profiles database 238, and messaging server 112 are all shown to be directly connected to core network 220 in FIG. 2, any or all of them could instead be part of a sub-network or LAN, for example comprising a backend services subsystem, which could in turn be connected to core network 220. Alternatively, they could be connected to packet network 222, either individually or, again, as part of a service subsystem. Other arrangements are possible as well.

b. EXEMPLARY CLIENT STATION AND NETWORK SERVER DEVICE

Figure 3:
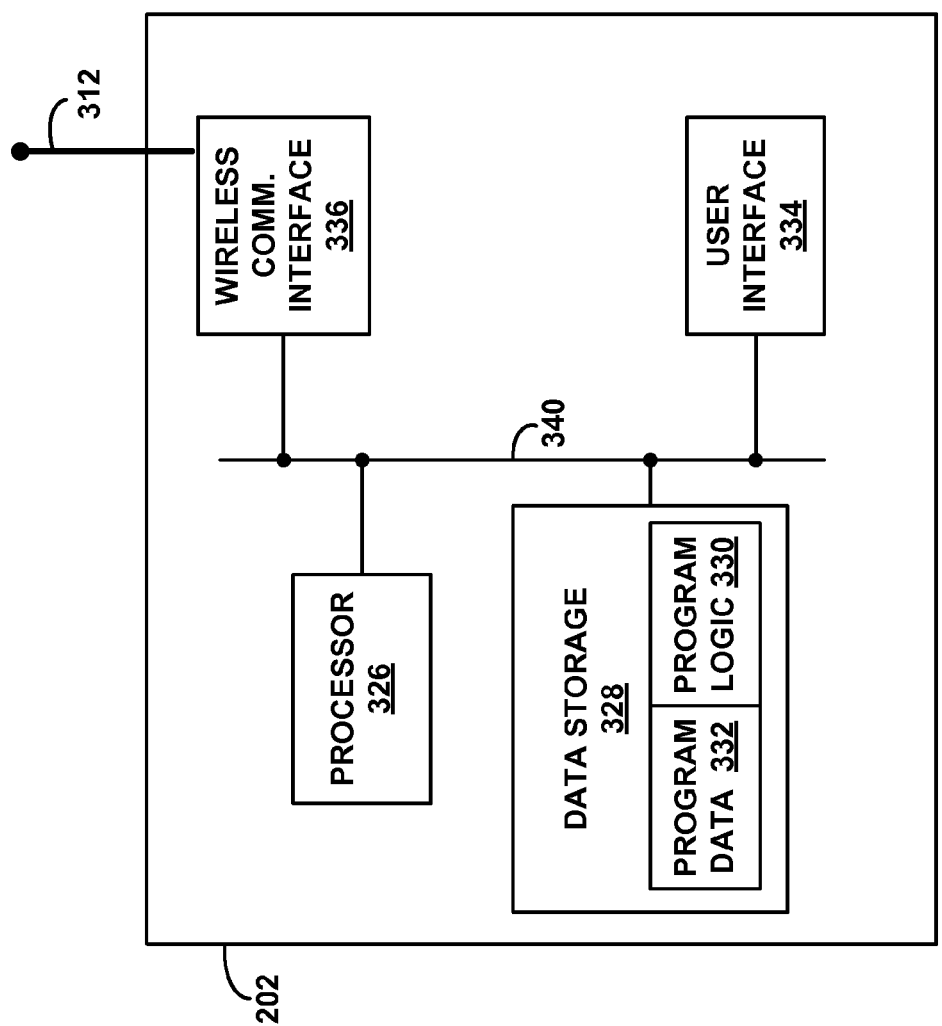
FIG. 3 is an example illustration of a functional architecture of a mobile station.

FIG. 3 is a simplified block diagram depicting functional components of an example MS 202 that may be provided pre-call-connection messaging service from network 200. The example MS 202, for example, could be or include a cell phone, a personal digital assistant (PDA), a pager, a wired or wirelessly-equipped notebook computer, or any other sort of mobile wireless device. As shown in FIG. 3, the example MS 202 includes a processor 326, data storage 328, a user-interface 334, and a wireless-communication interface 336, all of which may be coupled together by a system bus 340 or other mechanism.

The user-interface 334 of the MS 202 provides an input interface for a user of the device and/or provides output to a user of the device. As such, user interface 334 may include, without limitation, a microphone for audio input, a camera for image/video input, a speaker for audio output, an LCD display for visual output, and/or a keypad for alpha-numeric input, etc. In accordance with at least one embodiment, user input could include, without limitation, a user request to use the pre-call-connection messaging service from network 200 on a particular call, and audio and/or video data to record in a message for a called party. User output could include, without limitation, a ringback tone and/or an indication that the user may start recording a message for the called party.

Communication interface 336 enables communication with at least one network, such as network 200 in FIG. 2, perhaps via one or more access networks, such as RAN 209. As such, for access via RAN 209, for example, communication interface 336 may include a module, such as an MSM™-series chipset made by Qualcomm Inc. of San Diego, Calif., and an antenna 312. Further, communication interface 336 may support wireless packet-data communications according to a wireless standard such as cdma2000®. Alternatively or additionally, communication interface 336 may support other air interface protocols, including those for wireless local area network access, such as wireless Ethernet (IEEE 802.11), Bluetooth, and WiMax, for example.

Processing unit 326 may comprise one or more general-purpose processors (e.g., INTEL microprocessors) and/or one or more special-purpose processors (e.g., dedicated digital signal processor, application specific integrated circuit, etc.). In turn, the data storage 328 may comprise one or more volatile and/or non-volatile storage components, such as magnetic or optical memory or disk storage. Data storage 328 can be integrated in whole or in part with processing unit 326, as cache memory for instance. In at least one embodiment, data storage 328 may, as shown, be configured to hold both program logic 330 and program data 332.

Program logic 330 may comprise machine language instructions that define routines executable by processing unit 326 to carry out various functions described herein. By way of example, the program logic may be executable to communicate with communication interface 326 in order to set up a circuit-based phone call via MSC 214 by way of BTS 210 and BSC 212, and/or to establish a packet data session via PDSN 218 by way of BTS 210, BSC 212, and PCF 216. As another example, the program logic 330 and communication interface 336 may operate cooperatively to carry out packetization and transmission of audio and/or video data for recording of a message for a called party. And other possibilities exist as well.

Figure 4:
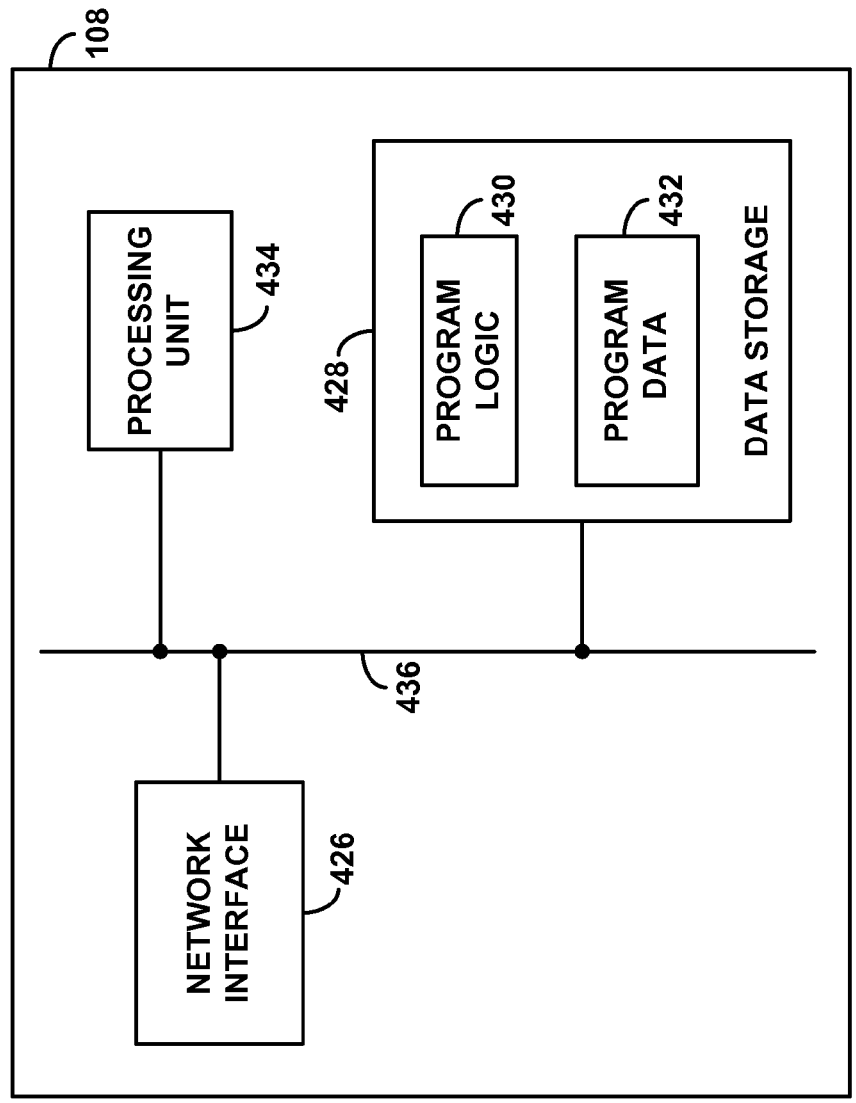
FIG. 4 is an example illustration of a functional architecture of a call server.

FIG. 4 is a simplified block diagram depicting functional components of an example call server 108 arranged to carry out various functions described herein. As mentioned earlier, call server 108 could in face include multiple devices of the same or different types. As examples, call server 108 could include one or more telephony switches and/or one or more MSCs. As shown in FIG. 4, the example call server 108 includes a network interface 426, data storage 428, and a processing unit 434, all of which may be coupled together by a system bus 436 or other mechanism.

Network interface 426 enables communication via at least one network, such as network 200. As such, network interface 426 may take the form of—or at least include—an Ethernet network interface card that can be coupled with a router and/or switch to communicate over a network such as core network 220, for example, or connected to a subnet, which in turn is couple to core network 220, as just a few examples. Alternatively, network interface 426 may take other forms, providing for wired and/or wireless communication on a network or a subnet. And other possibilities exist as well.

Processing unit 434 may comprise one or more general-purpose processors and/or one or more special-purpose processors. And data storage 428 may comprise one or more volatile and/or non-volatile storage components, which could be integrated in whole or in part with processing unit 434. As further shown, data storage 428 may be equipped to hold program logic 430 and program data 432.

Program logic 430 may comprise machine-language instructions that are executable by processing unit 434 to carry out various functions described herein.

Although the block diagram in FIG. 4 as described applies to operation of a call server 108, the same block diagram, perhaps with appropriate alterations to the block functions, may be applied to the operation of a messaging server, such as messaging server 112 in FIG. 2.

c. EXEMPLARY OPERATION

Figure 5:
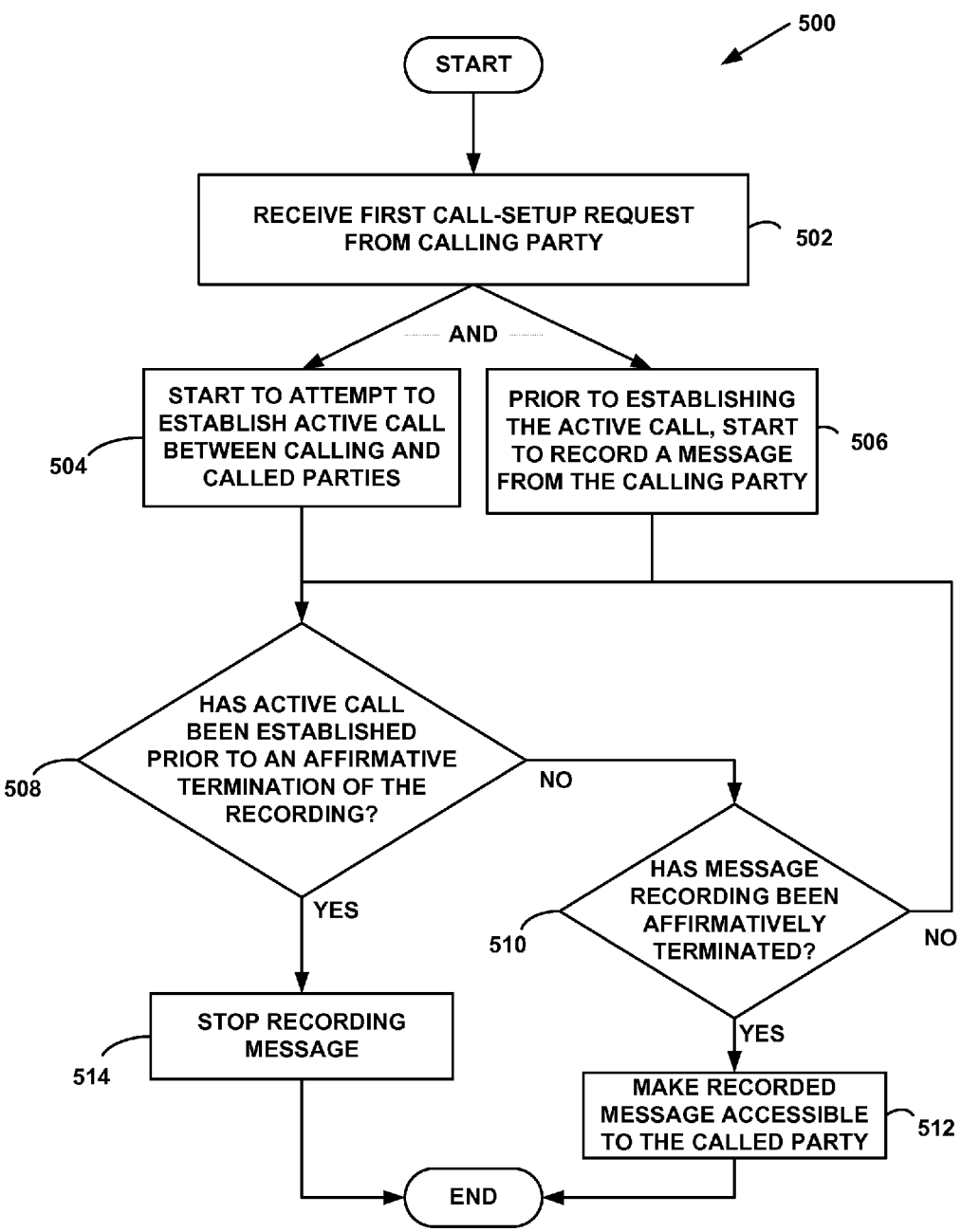
FIG. 5 is an example flowchart of a method according to at least one embodiment by which pre-call-connection messaging services are provided.
Figure 6:
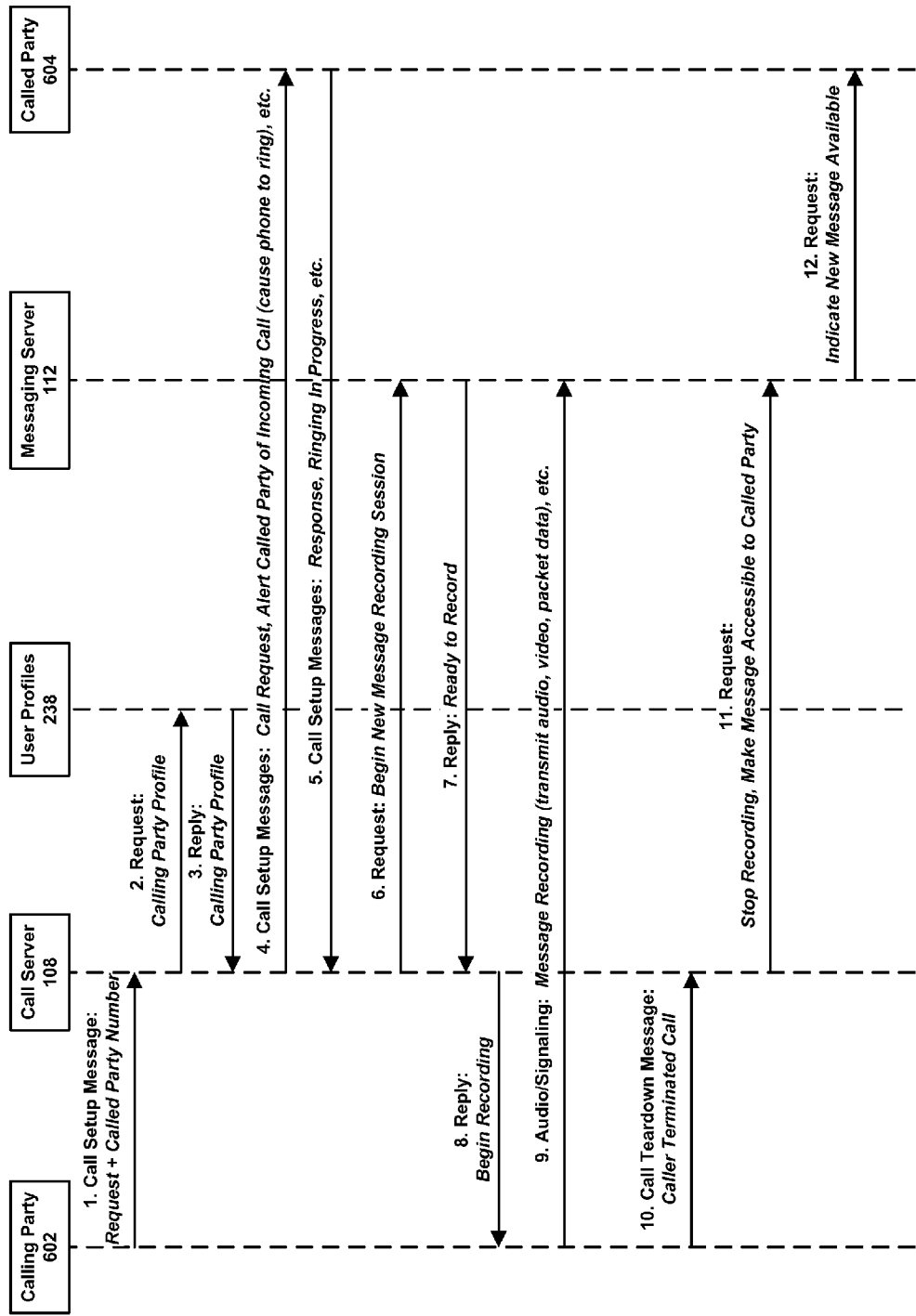
FIG. 6 is a pseudo-call-flow illustrating a first example operation of a pre-call-connection messaging service in accordance with at least one embodiment.
Figure 7:
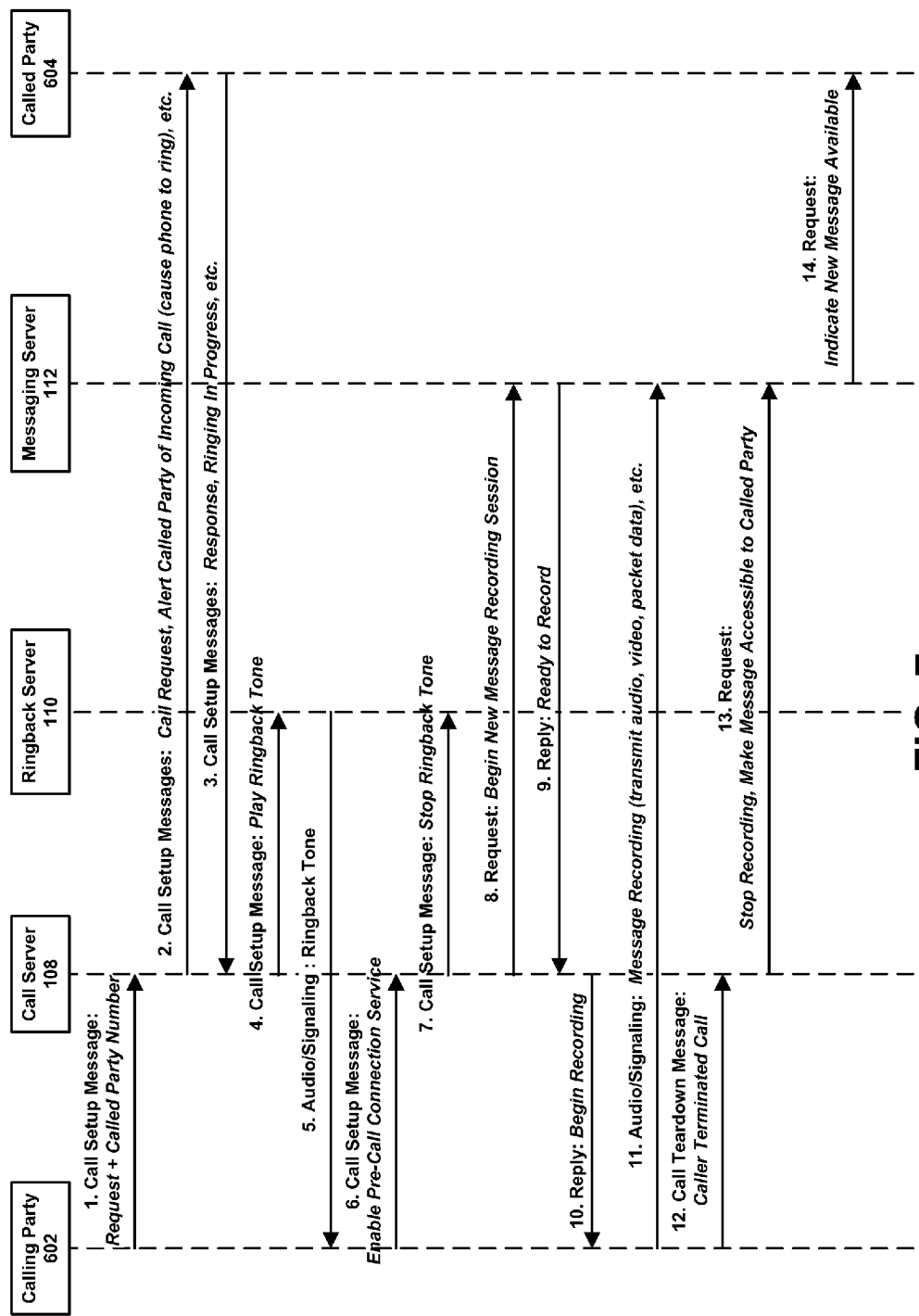
FIG. 7 is a pseudo-call-flow illustrating a second example operation of a pre-call-connection messaging service in accordance with at least one embodiment.

FIG. 5 depicts a flowchart of a method that may be carried out in accordance with at least one embodiment. In particular, FIG. 5 depicts a method 500 for providing pre-call-connection messaging services to a calling party. FIGS. 6 and 7 depict message flows between and among network 200 entities that implement example pre-call-connection messaging services. For ease of illustration, it is assumed here that the calling party 602 is MS 202 and that the called party 604 is MS 204, and further, that both MS 202 and MS 204 are associated with the same MSC 214 of the same RAN 209. However, it should be understood that the operation described could easily be adapted to a configuration in which the two mobile stations are associated with different RANs, or different elements of the same RAN, etc. Further, MS 202 and MS 204 could switch roles as calling and called client station, respectively, without impacting the embodiment. And other possibilities exist as well.

As shown in FIG. 5, the method 500 begins at step 502, when call server 108 receives a first call-setup request from the calling party 602. At step 504, call server 108 starts to attempt to establish an active call between the calling and called parties. At step 506, and prior to establishing the active call, call server 108 and messaging server 112 start to record a message from the calling party 602. At step 508, call server 108 determines whether an active call has been established prior to an affirmative termination of the recording. As stated above, an affirmative termination of the message recording may comprise one or more of (i) the calling party 602 hanging up and/or otherwise ending the call, (ii) the call server 108, messaging server 112, or some other network device detecting expiration of a timer that limits a duration of the message recording, and (iii) the calling party 602 generating and transmitting a message-termination indication, indicating that he or she is finished recording the message. And other methods of termination are certainly possible as well, as these possibilities are offered by way of example only.

If no active call has been established prior to the affirmative termination, call server 108 determines whether message recording has been affirmatively terminated at step 510, and if it has, causes messaging server 112 to make the recorded message accessible to the called party 604. If, at step 510, call server 108 determines that the message recording has not yet been affirmatively terminated, processing returns to step 508 to determine whether the active call has been established yet. If, at step 508, it is determined that an active call has been established prior to an affirmative termination of the recording, processing proceeds to step 514 where call server 108 causes messaging server 112 to stop recording the message. These steps are also discussed below, both with reference to the message-flow diagram of FIG. 6, and with reference to the message-flow diagram of FIG. 7.

At step 502, the calling party 602 transmits a first call-setup request (message 1 in FIG. 6) to the call server 108, which mediates the call setup. The call request may include the phone number of the called party 604, or some similar identifier. Along with the request, transmitted subsequently thereto, or perhaps not transmitted at all, may be a service-enabling indication that indicates the calling party's desire to enable pre-call-connection messaging service on the requested call. The service-enabling indication may take the form of a particular key-press on the keypad of MS 202, a particular voice command spoken into the MS 202, and/or one or more other user and/or automated instructions. Call server 108 may then authorize the call, and determine how to reach the called party 604, for example by querying a location server or network registration agent (not shown). In at least one embodiment, call server 108 may simply enable pre-call-connection messaging service for all calls received from the calling party 602. In at least one embodiment, call server 108 processes the call request in a standard manner (e.g., causing ringback server 110 to play a ringback tone to calling party 602) until the service-enabling indication, indicating the calling party's desire to use the pre-call-connection messaging service on the current call, is received. Once the service-enabling indication is received, call server 108 may cause the ringback server 110 to stop playing the ringback tone.

In at least one embodiment, step 502 comprises call server 108 requesting the calling party's profile (message 2 in FIG. 6) from user-profiles database 238, and receiving a reply (message 3 in FIG. 6). In at least one embodiment, the user profile (or similar information) could be returned as part of each call-setup transaction (e.g., an authorization step, or other inbound call-handling action, etc.), instead of its own separate request and reply (as illustrated in FIG. 6).

The returned profile may be in the form of a record or other output data format, and may contain various types of information used by call server 108 to process the call, such as authorizations, call-handling preferences, etc. In at least one embodiment, the profile includes an indication that calling party 602 subscribes to the pre-call-connection messaging service, where this indication may enable the service for all calls made by the calling party 602. In at least one embodiment, the profile includes a list of called-party identifiers for which the calling party 602 has enabled the pre-call-connection messaging service. In this case, the pre-call-connection messaging service may be enabled only for calls made to called parties associated with identifiers listed in the profile. Of course, the profile may list those called-party identifiers for which the calling party 602 has disabled the pre-call-connection messaging service, and the call server 108 may default to enabling the pre-call-connection messaging service absent finding a matching called-party identifier in the profile. And other possibilities exist as well.

In at least one embodiment, the profile may indicate that the pre-call-connection messaging service is not enabled by default, but rather must be enabled on a per-call basis by the calling party 602 generating and transmitting an appropriate service-enabling indication to the call server 108.

At step 504, call server 108 starts to attempt to establish an active call between the calling and called parties 602, 604. Call server 108 transmits a second call-setup message (message 4 in FIG. 6) (which again could be or include a forward of the first call-setup message) directed to the called party 604, intended to cause the called party's phone (MS 204) to ring. Assuming the called party's MS 204 is not busy, one or more messages are returned (message 5 in FIG. 6), including an indication that ringing is in progress. (Note that steps (4) and (5) are meant to represent possibly multiple, interleaved messages and/or transactions, even though they are shown in FIG. 6 as a single arrow in each direction.)

At step 506, and prior to establishing the active call, call server 108 causes messaging server 112 to start recording a message from the calling party 602. In this example, as shown in FIG. 6, call server 108 starts the process of causing messaging server 112 to start recording a message by transmitting a request (message 6 in FIG. 6) for a new message-recording session to messaging server 112. Subsequently, and perhaps after taking one or more actions in response to such a request, such as allocating storage for the new message recording, assigning an identifier to the new message-recording session, etc., messaging server 112 transmits a reply (message 7 in FIG. 6) to call server 108 that it is ready (or perhaps has already started) to record.

In response to receiving the reply message (7), call server 108 may transmit a message (message 8 in FIG. 6) to the calling party 602, signaling that it may begin recording a message for the called party 604. The message (8) from call server 108 to calling party 602 may be, for example, a short audio tone such as a beep, a vocal instruction to start recording a message, and/or one or more other indications meant to be interpreted by the calling party 602 as an indication to start recording a message.

In at least one embodiment, messages 6-7 of FIG. 6 may not be exchanged, but rather, any audio-video data received from calling party 602, prior to an active call being established between the calling and called parties, and prior to the message recording being affirmatively terminated, may be automatically routed to messaging server 112 for storage. In such an example, the call server 108 may transmit the message (message 8 in FIG. 6) to the calling party 602, signaling that it may begin recording a message for the called party 604, substantially immediately after receiving the call setup message (1), or perhaps substantially immediately after receiving the calling party profile and determining that the calling party 602 subscribes to the pre-call-connection messaging service, or perhaps substantially immediately after sending the call setup message (4), among other possibilities. In at least one embodiment, call server 108 may not send an indication to the calling party that it may begin recording a message for the called party 604.

Once messaging server 112 has indicated that it is ready to record, and a message has perhaps been transmitted to the calling party 602, signaling that it may begin recording a message, audio and/or video data that is received from the calling party 602 is transmitted to messaging server 112 for (at least temporary) storage (signaling 9 in FIG. 6). The transmission (signaling 9) may take the form of an audio and/or audio-visual signal, a packetized data message, etc. Note that in the case of an audio and/or video signal, it is assumed that an audio and/or video path between messaging server 112 and calling party 602 will first be established (although this step is not explicitly included in FIG. 6).

At step 508, call server 108 determines whether an active call has been established between the calling and called parties 602, 604 prior to an affirmative termination of the message recording. Although not illustrated in the message-flow diagram of FIG. 6, an active call may be established between the parties in response to call server 108 receiving a call-setup reply message from the called party 604, indicating that the call has been answered by the called party 604. Note that the call could be answered by a person, an answering machine or other voicemail service, a call-handling function, etc. Call server 108 may then instruct messaging server 112 to stop recording (step 514 of FIG. 5), perhaps explicitly inform calling party 602 that the call has been answered, and the active call would be established (an audio and/or video path is established between the calling and called parties). Call server 108 may, in the same or a separate instruction, instruct messaging server 112 to delete or otherwise remove the partial message recording recorded prior to the active call being established. In response, message server 112 may accordingly delete or otherwise remove the partial message recording from its data storage. After establishing the active call, the calling and called party may proceed with media exchange (e.g., conversation) or other transactions.

In the event that an active call has not been established, the process continues to step 510, where call server 108 determines whether the message recording has been affirmatively terminated, perhaps by the calling party 602 hanging up and/or otherwise ending the call, causing the MS 202 to transmit a call teardown message (message 10 in FIG. 6) to call server 108. Other methods of affirmative termination are certainly possible as well, including call server 108 and/or messaging server 112 detecting expiration of a timer that limits a duration of a message recording to, as examples, 30 seconds, 300 seconds, some duration therebetween, or any other suitable duration. Once such a limit has been reached, the call server 108 (perhaps instructed by the messaging server 112) may affirmatively terminate the recording. In such a case, the call server 108 may cause an audible indication (e.g., a short tone) to be provided to the calling party 602, indicating that the recording is being (or has been) terminated. The message recording may also be affirmatively terminated by the calling party generating and transmitting a message-termination indication to call server 602, indicating that he or she is finished recording the message. The message-termination indication may take the form of a particular key-press on the keypad of MS 202, a particular voice command spoken into the MS 202, and/or one or more other user and/or automated instructions. And other approaches are certainly possible as well.

If no affirmative termination of the recording is detected at step 510, processing returns to step 508, to again check whether an active call has been established. If an affirmative termination is detected at step 510, as illustrated in FIG. 6, processing continues to step 512. In response to detecting an affirmative termination of the recording (e.g., receiving the teardown message (10)), call server 108 transmits a request (message 11 in FIG. 6) to messaging server 112, instructing the messaging server 112 to stop recording, and perhaps also to make the recorded message accessible to the called party.

The recorded message may be made available to the called party 604 in a number of different ways, the selection of which may depend upon the type of client station that the called party 604 is using, among other factors. In the example of FIGS. 5 and 6, it is assumed that the called party 604 is using the MS 204 to which service is provided by the same wireless carrier that provides service to the MS 202 of the calling party 602. In this case, making the recorded message available to the called party 604 may comprise merely forwarding the message (and associated calling party 602 information, such as the identifier associate with the calling party's MS 202) to a message box associated with the called party 604. Upon receipt of the new message, an indication may be provided to the called party 604 (message 13 in FIG. 6) that a new message is available for retrieval. If, on the other hand, the called party's home network is not the same as the calling party's home network, making the recorded message accessible to the called party 604 may further comprise transmitting the recorded message to the called party's home network. And other possibilities exist as well.

In at least one embodiment, messages are recorded for called parties that are not associated with the wireless carrier. For example, if the called party 604 is using landline phone 206, the message may be stored within network 200, and a new phone call may be initiated to landline phone 206 at a later time, whereupon the recorded message may be played back for the called party 604. In at least one embodiment, the recorded message may be transmitted to an intermediate switch in PSTN 224 or an intermediate PBX, and stored there for later playback or delivery to landline phone 206. In at least one embodiment, if the called party 604 is using VoIP phone such as VoIP phone 208, the recorded message may be stored within network 200 for later playback, or may be transmitted to an intermediate switch in packet network 222 and stored for later playback or delivery to VoIP phone 208, etc. In the event that the landline phone 206 and/or VoIP phone 208 supports such functionality, the recorded message could be transmitted directly to, and stored at, the respective landline phone 206 and/or VoIP phone 208.

FIG. 7 illustrates an embodiment in which a pre-call-connection messaging service is enabled only after receiving a corresponding service-enabling indication from the calling party 602. In FIG. 7, character references and messages similar to those used in FIG. 6 are given similar labels. Further, only those steps differing from FIG. 6 are discussed below, and the disclosure above with regard to FIG. 6 is incorporated by reference with regard to steps similar to those of FIG. 7. As shown in FIG. 7, and for purposes of embodiments consistent therewith, the user-profiles database 238 of FIG. 6 is replaced in FIG. 7 with the ringback server 110.

In the event that pre-call-connection messaging service is enabled only after receiving a corresponding service-enabling indication from the calling party 602, in response to receiving the call-setup message (message 1 in FIG. 7) and the call-setup response (message 3 in FIG. 7), call server 108 may transmit a call-setup message (message 4 in FIG. 7) to the ringback server 110, instructing that ringback server 110 play a ringback tone to the calling party 602. Subsequent to receiving the instruction, ringback server 110 plays the ringback tone for the calling party (signaling 5 in FIG. 7). The transmission (signaling 5) may involve an audio file, DTMF tones, a packetized data message, and a combination thereof, as examples.

In embodiments consistent with FIG. 7, the calling party 602 then operates an input element of user interface 334 to cause the MS 202 to transmit an indication to call server 108 that the calling party 602 wishes to utilize pre-call-connection messaging service on the current call (message 6 in FIG. 7). In response to receiving such an indication (6), call server 108 transmits a call-setup message to ringback server 110, instructing the ringback server 110 to stop playing the ringback tone to the calling party 602. The remainder of the messages/signaling in FIG. 7 (8-14) function to record a message for the called party, and mirror the messages and signaling 6-12 of FIG. 6, and thus are not reproduced here. In such embodiments, then, the calling party 602 controls, on a call-by-call basis, whether pre-call-connection messaging is enabled.

FIGS. 6 and 7 represent generalized descriptions of the present pre-call-connection messaging services. It should be understood that, in practice, different network components may be employed, and specific protocols and messages may be used. Examples include, without limitation, IS-41 and related messages in a circuit-cellular-based system, SIP and related messages in a packet-based VoIP system, etc. Moreover, the steps may vary in order and number depending upon the type of call being placed, upon the specific implementation within the network context that supports the particular call type, and/or upon one or more other factors. For example, for a circuit-based call, there may be additional steps associated with establishing various legs of the circuit. Similarly, for a packet-based call, there may be steps that establish send and receive ports on client stations. And certainly there may be other additional and/or alternative steps.

d. CONCLUSION

Exemplary embodiments have been described above. Those skilled in the art will understand, however, that changes and modifications may be made to the described embodiments without departing from the true scope and spirit of the claims.

I claim:

1. A method of providing pre-call-connection messaging service to a calling party, the method comprising:
at least one network device receiving a first call-setup request from a calling party, the first call-setup request reflecting a request that an active call be set up between the calling party and a called party;
after receiving the first call-setup request, the at least one network device starting to attempt to establish the active call between the calling and called parties at least in part by transmitting a second call-setup request to the called party, the second call-setup request reflecting a request that an active call be set up between the calling and called parties;
prior to receiving a response to the second call-setup request, the at least one network device starting to record a message from the calling party while continuing to attempt to establish the active call; and
if the at least one network device detects an affirmative termination of the message recording prior to successfully establishing the active call, the at least one network device thereafter making the recorded message accessible to the called party.

2. The method of claim 1, further comprising:
if the at least one network device detects that the active call has been successfully established prior to an affirmative termination of the message, stopping recording of the message.

3. The method of claim 2, further comprising, providing to the calling party an auditory indication of the stopping of the recording of the message.

4. The method of claim 1, further comprising:
prior to starting to record the message from the calling party, determining that the calling party subscribes to the pre-call-connection messaging service at least in part by retrieving and examining a profile associated with the calling party.

5. The method of claim 4, wherein the profile comprises correlation data that, for each called party listed in the profile, notes whether pre-call-connection messaging service should be enabled for calls to the called party; and
wherein the method further comprises retrieving the correlation data from the profile and determining whether pre-call-connection messaging service should be enabled based on at least the first call-setup request and the correlation data.

6. The method of claim 1, further comprising:
prior to starting to record the message from the calling party, receiving a service-enabling indication from the calling party, signaling a desire to use the pre-call-connection messaging service for the call.

7. The method of claim 6, further comprising, prior to receiving the service-enabling indication from the calling party, playing a ringback tone to the calling party, and subsequent to receiving the service-enabling indication, stopping the playing of the ringback tone to the calling party.

8. The method of claim 6, wherein the service-enabling indication is a pre-defined key press.

9. The method of claim 8, further comprising:
prior to starting to record the message from the calling party, determining that the calling party subscribes to the pre-call-connection messaging service at least in part by retrieving and examining a profile associated with the calling party; and
wherein the pre-defined key press is set forth in the profile.

10. The method of claim 1, further comprising:
prior to starting to record the message from the calling party, determining that the calling party subscribes to the pre-call-connection messaging service at least in part by retrieving and examining a profile associated with the calling party;
retrieving a second destination from the profile, the second destination being different from the called party destination specified in the first call-setup request; and
if the at least one network device detects an affirmative termination of the message recording prior to successfully establishing the active call, the at least one network device thereafter making the recorded message accessible to the called party at least at the second destination.

11. The method of claim 10, wherein the second destination comprises at least one of a plain-old-telephone system (POTS) device, a voice-over-internet-protocol (VOIP) device, a message mailbox different from the called party's message mailbox, and a direct inward dialed destination (DID) on a private branch exchange (PBX).

12. The method of claim 1, wherein making the recorded message accessible to the called party comprises forwarding, to a message mailbox associated with the called party, one or more of the recorded message itself and a link to the recorded message.

13. The method of claim 1, wherein the recited step of starting to record the message from the calling party is carried out at substantially the same time as transmitting the second call-setup request.

14. The method of claim 1, wherein the message comprises at least one of a voicemail message and an audio-visual message.

15. The method of claim 1, further comprising:
prior to starting to record the message from the calling party, sending an indication directed to the calling party that the calling party may begin recording a message for the called party.

16. A system comprising at least one network device communicatively coupled to a communications network, the at least one network device comprising:
at least one communication interface;
at least one processor; and
data storage containing instructions executable by the at least one processor for causing the at least one network device to carry out a set of functions, the set including:

receiving a first call-setup request from a calling party, the first call-setup request reflecting a request that an active call be set up between the calling party and a called party;

after receiving the first call-setup request, starting to attempt to establish the active call between the calling and called parties at least in part by transmitting a second call-setup request to the called party, the second call-setup request reflecting a request that an active call be set up between the calling and called parties;

prior to receiving a response to the second call-setup request, starting to record a message from the calling party while continuing to attempt to establish the active call; and if the at least one network device detects an affirmative termination of the message recording prior to successfully establishing the active call, thereafter making the recorded message accessible to the called party.

17. The system of claim 16, the set of functions further comprising:

if the at least one network device detects that the active call has been successfully established prior to an affirmative termination of the message, stopping recording of the message.

18. The system of claim 16, the set of functions further comprising:

prior to starting to record the message from the calling party, determining that the calling party subscribes to the pre-call-connection messaging service at least in part by retrieving and examining a profile associated with the calling party.

19. The system of claim 18, wherein the profile comprises correlation data that, for each called party listed in the profile, notes whether pre-call-connection messaging service should be enabled for calls to the called party; and the set of functions further comprising retrieving the correlation data from the profile and determining whether pre-call-connection messaging service should be enabled based on at least the first call-setup request and the correlation data.

20. The system of claim 16, the set of functions further comprising:

prior to starting to record the message from the calling party, receiving a service-enabling indication from the calling party, signaling a desire to use the pre-call-connection messaging service for the call.

21. The system of claim 20, the set of functions further comprising:

prior to receiving the service-enabling indication from the calling party, playing a ringback tone to the calling party, and subsequent to receiving the service-enabling indication, stopping the playing of the ringback tone to the calling party.

22. The system of claim 16, wherein making the recorded message accessible to the called party comprises forwarding, to a message mailbox associated with the called party, one or more of the recorded message itself and a link to the recorded message.

23. The system of claim 16, wherein the recited step of starting to record the message from the calling party is carried out at substantially the same time as transmitting the second call-setup request.

24. The system of claim 16, wherein the message comprises at least one of a voicemail message and an audio-visual message.

25. The system of claim 16, the set of functions further comprising:

prior to starting to record the message from the calling party, sending an indication directed to the calling party that the calling party may begin recording a message for the called party.

* * * * *